(12) United States Patent
Jun et al.

(10) Patent No.: US 7,988,761 B2
(45) Date of Patent: Aug. 2, 2011

(54) METHOD FOR MANUFACTURING METAL NANOPARTICLES COMPRISING ROD-SHAPED NANOPARTICLES

(75) Inventors: Byung-Ho Jun, Seoul (KR); Jae-Woo Joung, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 855 days.

(21) Appl. No.: 11/987,182

(22) Filed: Nov. 28, 2007

(65) Prior Publication Data
US 2010/0275729 A1    Nov. 4, 2010

(30) Foreign Application Priority Data

Sep. 28, 2007    (KR) .................. 10-2007-0098397

(51) Int. Cl.
*B22F 9/16*    (2006.01)
*B22F 9/18*    (2006.01)
*B22F 9/20*    (2006.01)

(52) U.S. Cl. ............... 75/373; 75/343; 75/370; 75/371; 977/773; 977/775; 977/777; 977/810

(58) Field of Classification Search .................. 75/343, 75/362–365, 369–374, 392, 414, 416, 419–432, 75/710, 711, 721–723, 739–741; 977/773, 977/775, 777, 810, 896; 423/23

See application file for complete search history.

(56) References Cited

U.S. PATENT DOCUMENTS

| 7,591,872 B1 * | 9/2009 | Jun et al. ................... 75/371 |
| 7,628,840 B2 * | 12/2009 | Atsuki et al. ................ 75/717 |
| 7,648,554 B2 * | 1/2010 | Nakamoto et al. ........... 75/343 |

* cited by examiner

*Primary Examiner* — Scott Kastler
*Assistant Examiner* — Vanessa Velasquez
(74) *Attorney, Agent, or Firm* — McDermott Will & Emery LLP

(57) ABSTRACT

The present invention relates to a method for manufacturing metal nanoparticles containing rod-shaped nanoparticles, the method including: producing metal oxide nanoparticle intermediates having at least rod-shaped metal oxide nanoparticles by heating a mixture of a nonpolar solvent, a metal precursor and an amine including secondary amine at 60-300° C.; producing metal nanoparticles by adding a capping molecule and a reducing agent to the mixture and heating the result mixture at 90-150° C.; and recovering the metal nanoparticles. According to the present invention, the shape of metal nanoparticle can be controlled by mixing primary amines or secondary amines as proper ratio without using apparatus additionally, as well as, the size of metal nanoparticle can be controlled to several nm.

17 Claims, 4 Drawing Sheets

METHOD FOR MANUFACTURING METAL NANOPARTICLES COMPRISING ROD-SHAPED NANOPARTICLES

CROSS-REFERENCE TO RELATED APPLICATIONS

This application claims the benefit of Korean Patent Application No. 10-2007-0098397 filed on Sep. 28, 2007, with the Korea Intellectual Property Office, the contents of which are incorporated here by reference in their entirety.

BACKGROUND

1. Technical Field

The present invention relates to a method for manufacturing metal nanoparticles including rod-shaped nanoparticles, more particularly, to a method for manufacturing metal nanoparticles that can control size of metal nanoparticles to several nm and shape of metal nanoparticle to rod shape.

2. Description of the Related Art

In response to demands for electronic components with miniaturization and high-densification, needs for metal patterning in a thin film using inkjet or formation of microwiring on a substrate have been increased. To implement this, it is necessary to produce conductive ink which is made from nano size of copper particles having a uniform shape, a narrow distribution of particles and an excellent dispersibility.

There are various methods of producing copper nanoparticles, such as mechanical grinding method, co-precipitation method, spray, sol-gel method, electro-deposition method, and microemulsion method, etc. In case of producing metal nanoparticles by the co-precipitation method widely used, it is impossible to control size, shape, size distribution of particles. In case of producing by the electro-deposition method and sol-gel method, it is difficult to produce in mass production and production cost is high. Also, in case of producing by the microemulsion method, it is easy to control size, shape, size distribution of particles, however, it is not suitable for practical use as the production process is complicated.

A method for nanoparticle in solution has a restriction for concentration. In other words, preparing nanoparticles with uniformity in size is achieved below 0.01M and productivity is also unpreferable. Thus, to preparing nanoparticles with uniformity in size, a reactor with size of 1000 L is required.

Also, conventional methods for manufacturing nanorod metal particles are laser ablation method and chemical vapor deposition, etc. These methods control materials to be synthesized and catalyst with proper ration and perform vaporization using high temperature and laser. However, the above methods require high-cost apparatus and, also have limitations for controlling particle size since it is difficult to not only control the size of particles finely but also produce particles with a desired dispersibility.

Besides the above methods, methods that are conducted in solution are a AAO (Anodized Aluminum Oxide) method that prepares 1-dimension wire by using aluminum as a substrate and a particle synthesis that uses porous materials such as MCMs (MCM-41, MCM-48) and zeolite, etc. Such porous materials are not proper for controlling size, dispersion and recovering of particles.

SUMMARY

The present invention was accomplished taking into account of the problems as described above. The present invention provides a method for manufacturing metal nanoparticles containing rod-shaped nanoparticles, the method including: producing metal oxide nanoparticle intermediates having at least rod-shaped nanoparticles by heating a mixture of a nonpolar solvent, a metal precursor and an amine including secondary amine at 60-300° C.; producing metal nanoparticles by adding a capping molecule and a reducing agent and heating the mixture at 90-150° C.; and recovering the metal nanoparticles.

According to an embodiment of the invention, the metal precursor is a copper precursor.

Here, the copper precursor is selected from a group consisting of copper (II) nitrate, copper (II) acetate and copper (II) acetylacetonate.

According to an embodiment of the invention, the amine compound containing secondary amine is mixed in a mole of 2 to 10 with respect to 1 mole of the metal precursor.

According to an embodiment of the invention, the secondary amine in the amine compound containing secondary amine is mixed in a mole of 0.1 to 1 with respect to 1 mole of the primary amine.

According to an embodiment of the invention, the primary amine is an alkylamine having carbon numbers of 4 to 18. Also, here, the alkylamine having carbon numbers of 4 to 18 is at least one selected from a group consisting of butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine and octadecylamine.

According to an embodiment of the invention, the secondary amine is an amine having carbon numbers of 4 to 16. Also, here, the secondary amine having carbon numbers of 4 to 16 is at least one selected from a group consisting of diethylamine, dipropylamine, dibutylamine, dipentylamine, dihexylamine, diheptylamine and dioctylamine.

According to an embodiment of the invention, the capping molecule is a fatty acid or an amine. Here, the fatty acid is oleic acid According to an embodiment of the invention, the nonpolar solvent is at least one selected from a group consisting of toluene, hexane, cyclohexane, decane, dodecane, tetradecane, hexadecane, octadecane and octadecene.

According to an embodiment of the invention, the nonpolar solvent is mixed in a mole of 3 to 30 with respect to 1 mole of the metal precursor.

According to an embodiment of the invention, the reducing agent is at least one selected from a group consisting of ammonium formate, dimethylamine borane, ter-butylamine borane, and triethylamine borane.

According to an embodiment of the invention, the reducing agent is mixed in a mole of 1 to 10 with respect to 1 mole of the metal precursor.

According to an embodiment of the invention, the metal nanoparticle is recovered using methanol or acetone.

Additional aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION

Figure 1:
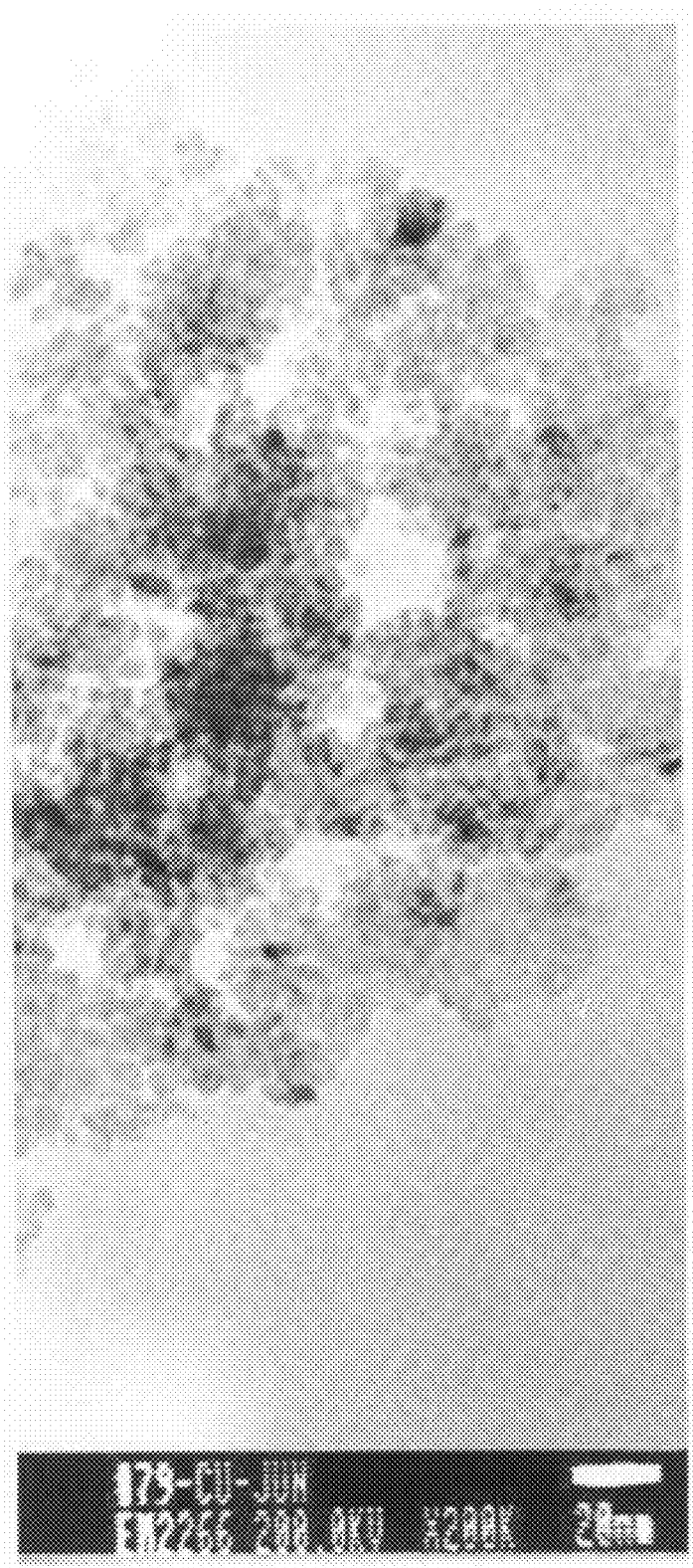
FIG. 1 is a TEM image of the CuO nanoparticles manufactured according to Comparative Example 1 of the invention.

Hereinafter, preferred embodiments will be described in detail of the method for manufacturing metal nanoparticles including rod-shaped nanoparticles according to the present invention.

The present invention relates to a method for manufacturing metal nanoparticles containing rod-shaped nanoparticles, the method including: producing metal oxide nanoparticle intermediates having at least rod-shaped nanoparticles by heating a mixture of a nonpolar solvent, a metal precursor and an amine including secondary amine at 60-300° C.; producing metal nanoparticles by adding a capping molecule and a reducing agent to the mixture and heating the result mixture at 90-150° C.; and recovering the metal nanoparticles. For example, the metal precursor may be a copper precursor and examples of the copper precursor may be copper (II) nitrate, copper (II) acetate or copper (II) acetylacetonate, etc. Such copper precursors are preferable since they are available for controlling the shape of CuO in the production of CuO as intermediate.

The present invention relates to a method for manufacturing metal nanoparticles containing rod-shaped nanoparticles, the method including: producing metal oxide nanoparticle intermediates having at least rod-shaped nanoparticles by heating a mixture of a nonpolar solvent, a metal precursor and an amine including secondary amine at 60-300° C.; producing metal nanoparticles by adding a capping molecule and a reducing agent to the mixture and heating the result mixture at 90-150° C.; and recovering the metal nanoparticles. For example, the metal precursor may be a copper precursor and examples of the copper precursor may be copper (II) nitrate, copper (II) acetate or copper (II) acetylacetonate, etc. Such copper precursors are preferable since they are available for controlling the shape of CuO in the production of CuO as intermediate.

In the step of producing metal oxide nanoparticle intermediates including at least rod-shaped nanoparticles by heating a mixture of a nonpolar solvent, a metal precursor and an amine including secondary amine at 60-300° C., if the temperature is lower than 60° C., metal oxide nanoparticles cannot be formed. If the temperature is higher than 300° C., it is not preferable since micro particles rather than nanoparticles are formed.

In the step of producing metal nanoparticles by adding a capping molecule and a reducing agent to the mixture and heating the result mixture at 90-150° C., if the temperature is lower than 90° C., metal oxide particles rather than metal particles are formed. If the temperature is higher than 150° C., it is not preferable since bulk compound rather than nanoparticles is formed.

Also, if the amine compound containing secondary amine is a mixture of a primary amine and a secondary amine, the secondary amine may be mixed in a mole of 0.1 to 1 with respect to 1 mole of the primary amine. If the secondary amine is more than 1 mole, only dot-shaped nanoparticles may be produced and rod-shaped nanoparticles cannot be produced, if the secondary amine is less than 0.1 mole, size of particles cannot be controlled to nano size.

The mixture of a primary amine and a secondary amine may be mixed in a mole of 2 to 10 with respect to 1 mole of the metal precursor. If the content of amine is less than 2 moles, it is difficult to prepare metal oxide particles such as CuO as intermediate since the metal precursor is dissociated. If the content of amine is more than 10 moles, only dot-shaped nanoparticles may be produced.

The primary amine may be an alkylamine having carbon numbers of 4 to 18, for example, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, or octadecylamine, etc. but it is not limited to them.

The secondary amine may be an amine having carbon number of 4 to 16, for example, diethylamine, dipropylamine, dibutylamine, dipentylamine, dihexylamine, diheptylamine and dioctylamine, etc. but it is not limited them.

Also, the capping molecule may be a fatty acid or an amine and oleic acid. The fatty acid may have carbon numbers of 8 to 18 and an example includes dodecanoic acid, etc. The fatty acid may have a structure of $CH_3(CH_2)_nCOOH$. The amine may be alkylamine, preferably, decylamine, dodecylamine, tetradecylamine, hexadecylamine, octadecylamine, oleylamine, etc.

The capping molecule may be mixed in a mole of 0.5 to 10 with respect to 1 mole of the metal precursor.

The nonpolar solvent may be toluene, hexane, cyclohexane, decane, dodecane, tetradecane, hexadecane, octadecane or octadecene, etc.

The nonpolar solvent controls reaction temperature and is useful for dilution. The nonpolar solvent is mixed in a mole of 3 to 30 with respect to 1 mole of the metal precursor. If the content of the nonpolar solvent is less than 3 moles, uniform reaction solution cannot be formed. If the content of the nonpolar solvent is more than 30 moles, it is not preferable since excessive nonpolar solvent are used.

In the present invention, the reducing agent may be various kinds, desirably, a weak reducing agent may be used, for example, dimethylamine borane, ter-butylamine borane, triethylamine borane, etc, more desirably, formate material such as formic acid, ammonium formate can be used.

Also, the reducing agent may be mixed in a mole of 1 to 10 with respect to 1 mole of the metal precursor. If the content of reducing agent is less than 1 mole, the effect of reducing agent is decreased so that productivity is lowered. If the content of reducing agent is more than 10 moles, it is not efficient since excessive amount of reducing agent is used.

In the step of recovering the metal nanoparticles capped with alkylamine, methanol or acetone or a mixture of methanol and acetone can be used, but it is not limited to them.

The method for manufacturing metal nanoparticles was set forth above in detail, and hereinafter, explanations will be given in greater detail with specific examples. While the embodiment of the present invention provides the production of metal nanoparticles, the invention is not limited to the examples stated below and may be used for production of another metal nanoparticles. It is also apparent that more changes may be made by those skilled in the art without departing from the principles and spirit of the present invention.

Comparative Example 1

Preparation of Metal Nanoparticles in Dot Shape

After 1 mol of $Cu(NO_3)_2$ and 0.4 mol of butylamine were added to 200 ml of toluene, CuO was produced by heating at 80° C. After 1 mol of oleic acid and 4 mol of formic acid were added to the produced CuO nanoparticles, the heating temperature was increased to 110° C. After 1 hour of the reaction, dot-shaped copper nanoparticles were washed with methanol and recovered.

Example 1

Preparation of Metal Nanoparticles Including Rod-Shaped Nanoparticles

After 1 mol of $Cu(NO_3)_2$, 0.4 mol of butylamine and 0.1 mol of dibutylamine were added to 200 ml of toluene, CuO was produced by heating at 80° C. After 1 mol of oleic acid and 4 mol of formic acid were added to the produced CuO nanoparticles, the heating temperature was increased to 110° C. After 1 hour of the reaction, copper nanoparticles including rod-shaped nanoparticles were washed with methanol and recovered.

The TEM image of CuO nanoparticles prepared in Comparative Example 1 was shown in FIG. 1. It is noted that dot-shaped CuO nanoparticles with a size less than 10 nm were generated as shown in FIG. 1.

Figure 2:
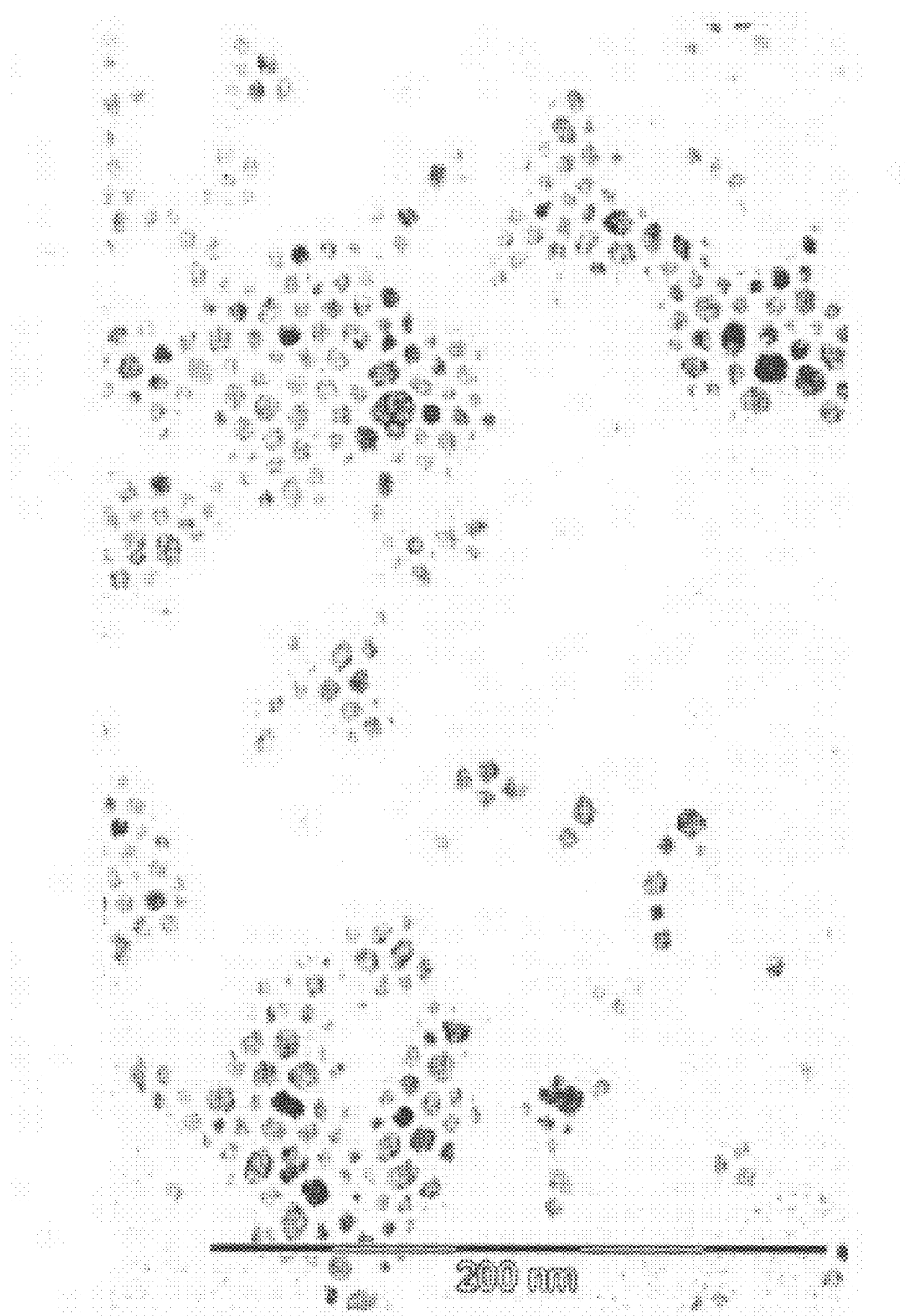
FIG. 2 is a TEM image of the Cu nanoparticles manufacture according to Comparative Example 1 of the invention.

The TEM image of Cu nanoparticles prepared from the CuO nanoparticles in Comparative Example 1 was shown in FIG. 2. It is noted that dot-shaped Cu nanoparticles were produced from the dot-shaped CuO nanoparticles as shown in FIG. 2.

Figure 3:
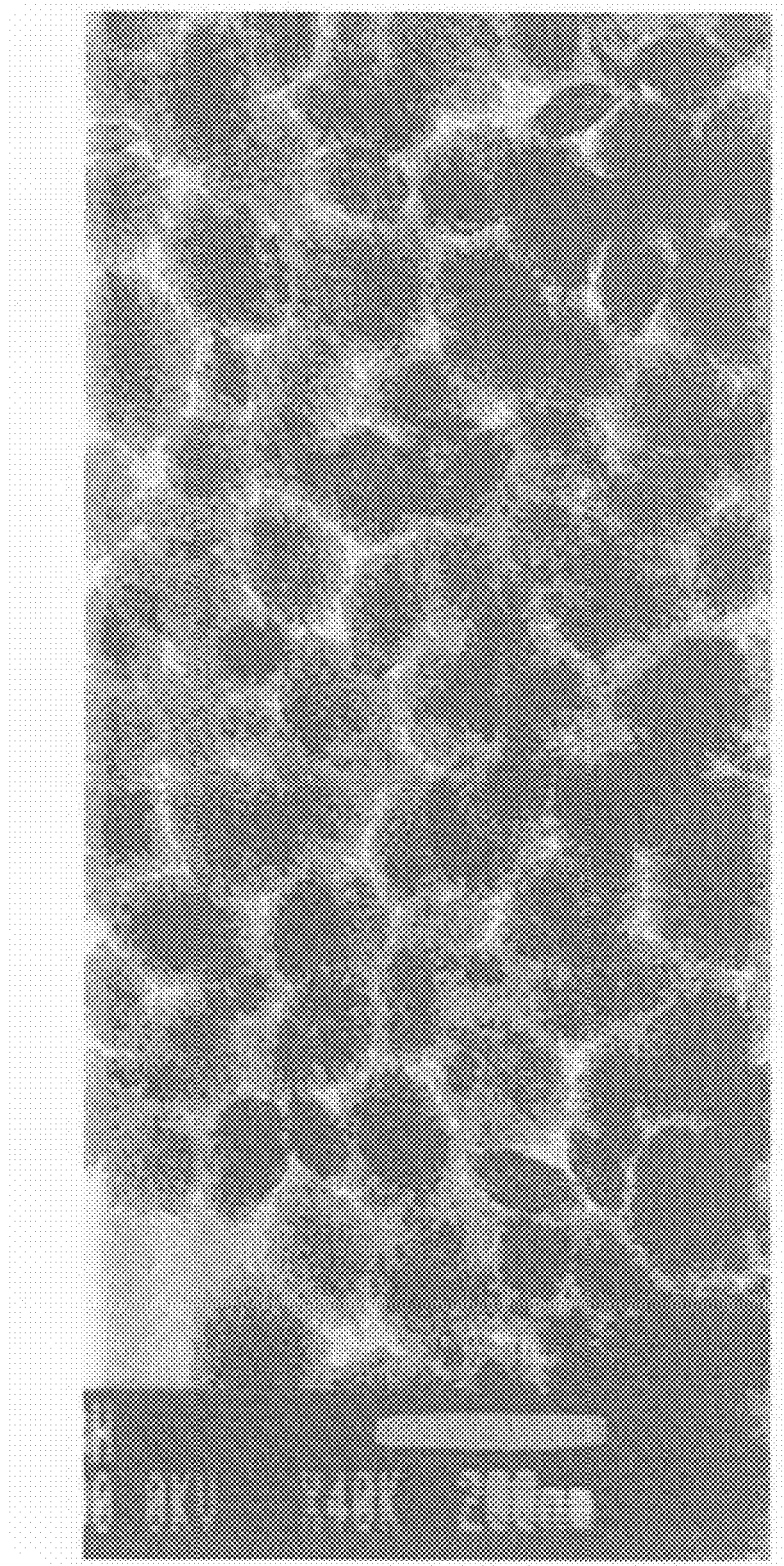
FIG. 3 is a TEM, image of the CuO nanoparticles manufactured according to Example 1 of the invention.

The TEM image of CuO nanoparticle prepared in Example 1 was shown in FIG. 3. It is noted that a mixture of dot-shaped and rod-shaped CuO nanoparticles with a size less than 10 nm were generated as shown in FIG. 3.

Figure 4:
FIG. 4 is a TEM image of the Cu nanoparticles manufacture according to Example 1 of the invention.

The TEM image of Cu nanoparticles prepared from the CuO nanoparticles in Example 1 was shown in FIG. 4. It is noted that a mixture of dot-shaped and rod-shaped Cu nanoparticles were produced from the mixture of dot-shaped and rod-shaped CuO nanoparticles as shown in FIG. 4. Further, the Cu nanoparticles showed very high dispersibility.

What is claimed is:

1. A method for manufacturing metal nanoparticles containing rod-shaped nanoparticles, the method comprising:
   producing metal oxide nanoparticle intermediates having at least rod-shaped metal oxide nanoparticles by heating a mixture of a nonpolar solvent, a metal precursor and an amine including secondary amine at 60-300° C.;
   producing metal nanoparticles by adding a capping molecule and a reducing agent to the mixture and heating the resulting mixture at 90-150° C.; and
   recovering the metal nanoparticles.

2. The method of claim 1, wherein the metal precursor is a copper precursor.

3. The method of claim 2, wherein the copper precursor is selected from the group consisting of copper (II) nitrate, copper (II) acetate and copper (II) acetylacetonate.

4. The method of claim 1, wherein the amine compound containing secondary amine is mixed in an amount of 2 to 10 mole with respect to 1 mole of the metal precursor.

5. The method of claim 1, wherein the amine including secondary amine further comprises a primary amine.

6. The method of claim 1, wherein the secondary amine in the amine compound containing secondary amine is mixed in an amount of 0.1 to 1 mole with respect to 1 mole of the primary amine.

7. The method of claim 5, wherein the primary amine is an alkylamine having 4 to 18 carbons.

8. The method of claim 7, wherein the alkylamine having 4 to 18 carbons is at least one selected from the group consisting of butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine and octadecylamine.

9. The method of claim 7, wherein the secondary amine is an amine having 4 to 16 carbons.

10. The method of claim 9, wherein the secondary amine having 4 to 16 carbons is at least one selected from the group consisting of diethylamine, dipropylamine, dibutylamine, dipentylamine, dihexylamine, diheptylamine and dioctylamine.

11. The method of claim 1, wherein the capping molecule is a fatty acid or an amine.

12. The method of claim 11, wherein the fatty acid is oleic acid.

13. The method of claim 1, wherein the nonpolar solvent is at least one selected from the group consisting of toluene, hexane, cyclohexane, decane, dodecane, tetradecane, hexadecane, octadecane and octadecene.

14. The method of claim 1, wherein the nonpolar solvent is mixed in an amount of 3 to 30 mole with respect to 1 mole of the metal precursor.

15. The method of claim 1, wherein the reducing agent is at least one selected from the group consisting of ammonium formate, dimethylamine borane, ter-butylamine borane, and triethylamine borane.

16. The method of claim 1, wherein the reducing agent is mixed in an amount of 1 to 10 mole with respect to 1 mole of the metal precursor.

17. The method of claim 1, wherein the metal nanoparticle is recovered using methanol or acetone.

* * * * *